United States Patent
Kamei

[11] 3,925,137
[45] Dec. 9, 1975

[54] METHOD FOR PRODUCING FLAME-RETARDANT FIREPROOF CLEAR COAT

[75] Inventor: Masutada Kamei, Tokyo, Japan

[73] Assignee: Agency of Industrial Science & Technology, Tokyo, Japan

[22] Filed: Mar. 12, 1974

[21] Appl. No.: 450,325

[30] Foreign Application Priority Data

Mar. 13, 1973 Japan............................ 48-29777

[52] U.S. Cl. ............. 156/278; 8/116 P; 106/15 FP; 156/280; 252/8.1; 428/921
[51] Int. Cl.² ... B32B 33/00; C09D 5/18; C09K 3/28
[58] Field of Search ...... 117/136, 137, 72; 161/146, 161/403, 413; 156/278, 280; 8/116 P; 106/15 FP; 252/8.1

[56] References Cited
UNITED STATES PATENTS

| | | | |
|---|---|---|---|
| 2,628,946 | 2/1953 | Juda et al. | 156/280 |
| 3,284,216 | 11/1966 | Kaplar | 106/16 |
| 3,396,129 | 8/1968 | Yeadon et al. | 117/137 |
| 3,448,046 | 6/1969 | Schalin | 117/137 |
| 3,448,075 | 6/1969 | Clark et al. | 106/15 FP |
| 3,449,161 | 6/1969 | Hindesinn | 117/137 |
| 3,459,588 | 8/1969 | Davis | 117/137 |
| 3,616,005 | 10/1971 | Wetstone | 156/278 |
| 3,639,304 | 2/1972 | Raley | 161/403 |
| 3,663,463 | 5/1972 | Wren | 161/403 |
| 3,855,134 | 12/1974 | Green et al. | 252/8.1 |

FOREIGN PATENTS OR APPLICATIONS 4,535,997  11/1970  Japan.................................. 252/8.1

OTHER PUBLICATIONS

Paint Additives, Metal Finishing, Mar. 1967, pp. 56–59.

*Primary Examiner*—Charles E. Van Horn
*Assistant Examiner*—J. J. Gallagher
*Attorney, Agent, or Firm*—Oblon, Fisher, Spivak, McClelland & Maier

[57] ABSTRACT

A flame-retardant clear coat is produced by applying to the surface of a substrate a paint consisting of ammonium phosphate monobasic, pentaerythritol, dicyandiamide and a vehicle; a decorative material; and a paint consisting of a polyurethane resin of the type used in paints, tris(2-chloroethyl)-phosphate and tris(2-bromoethyl)-phosphite in the order mentioned.

5 Claims, 1 Drawing Figure

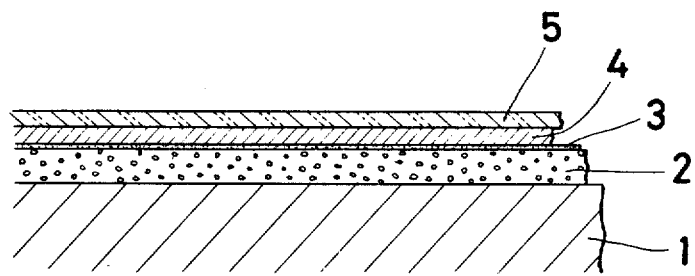

METHOD FOR PRODUCING FLAME-RETARDANT FIREPROOF CLEAR COAT

BACKGROUND OF THE INVENTION:

This invention relates to a method for forming on a substrate a decorative clear film having a flame retarding and fireproofing property.

Generally as paints, there have heretofore been used paints of cellulose type, natural resin type and synthetic resin type. These are invariably organic substances and, therefore, the coats formed of such paints are highly inflammable in themselves. For example, building materials on which these paints are used burn at a high velocity in case of a fire. Frequently in houses using such building materials, a fire tends to entail a heavy loss of life and property.

Flame-retardant and fireproof paints have also been developed. Since these paints are opague, however, they have a serious disadvantage in that they totally hide the colors and patterns of substrates which are coated by them. In the case of wood materials, for example, they mask out grains, patterns, textures, colors, etc. peculiar to the wood materials. When they are applied to paper and cloth substrates designed to produce decorative effects, they completely obscure the designs.

BRIEF SUMMARY OF THE INVENTION:

This invention relates to a method for forming a coat which is not easily burned and which has a fireproofing effect with respect to the material coated and is yet possessed of a decorative surface by sequentialy applying to the surface of a given substrate a flame-retardant foaming paint, a decorative material and a flame-retardant clear paint in the order mentioned. As the flame-retardant foaming paint, there is used a mixture which consists of ammonium phosphate monobasic, pentaerythritol, dicyandiamide and a vehicle. A mixture consisting of a polyurethane resin of the type used in paint, tris(2-chloroethyl)-phosphate and tris(2-bromoethyl)-phosphate is used as the flame-retardant clear paint.

A main object of this invention is to form on the surface of a given substrate a flame-retardant, fireproof and decorative coat.

Other characteristics and other benefits of this invention will become apparent from the description of this invention to be given herein below with reference to the accompanying drawing.

BRIEF EXPLANATION OF THE DRAWING:

The drawing is a cross section illustrating one preferred embodiment of the coat formed in accordance with the method of this invention.

DETAILED DESCRIPTION OF THE INVENTION:

This invention relates to a method for forming a flame-retardant fireproof clear coat which is itself flame retardant and is furthermore capable of retarding the combustion of the substrate which it coats. To be more specific, this invention is directed to a method for applying to the surface of a given substrate a flame-retardant clear paint and a flame-retardant foaming paint in the form of a laminate, with a decorative material interposed therebetween, so that the two paints cooperate with each other to confer on the produced coat both flame-retarding property and clarity.

Referring to the drawing, 1 denotes a substrate subjected to coating. The surface of this substrate is coated with a flameretardant foaming paint which is prepard by mixing 30 – 40 parts by weight of ammonium phosphate monobasic, 20 parts by weight of pentaerythritol, 20 parts by weight of dicyandiamide, 40 – 60 parts by weight of a vehicle using polyvinyl acetate as a principal ingredient and having an involatile control of 60%, and 50 parts by weight of water. After this flame-retardant foaming paint has dried, a decorative material 4 made of wood, paper, cloth or some other substance is attached thereto with the aid of an adhesive agent 3. To the upper surface of the decorative material 4 is applied a flame-retardant clear paint 5 which is composed of 100 parts by weight of a polyurethane resin of the type used in paint having a viscosity of 10 – 13 sec. (FC No. 4 at 20°C), 7 – 10 parts by weight of tris(2-chloroethyl)-phosphate and 1 – 3 parts by weight of tris (2-bromoethyl)-phosphite. In the coat thus formed, since the flame-retardant foaming paint contains ammonium phosphate monobasic, pentaerythritol and dicyandiamide in the form of opaque particles, the film of this paint is opaque and, therefore, keeps the appearance of the substrate surface completely out of sight. In this flame-retardant foaming paint, ammonium phosphate monobasic may be relaced as described afterward by a phosphoric acid compound of the type capable of generating phosphorus pentoxide upon heating. Also, starch may be effectively used in placd of pentaerythritol. In this case, however, starch helps to add to the hygroscopicity of the coat and inevitably degrades the degree of waterproofness of the coat. When the substrate subjected to coating is made of wood or is a material composed preponderantly of inflammable substances such as wood and fiber, this flame-retardant paint must be applied thereto in an amount enough to give a dry film thickness of not less than 300$\mu$. The vehicle binder described above may be replaced by a countertype containing a substance capable of manifesting an equal effect. Water merely functions as a solvent and serves the purpose of facilitating the work of coat application. The suitable amount of water for this purpose can, therefore, be determined sufficiently by merely taking into due consideration the ease with which the work of coat application is accomplished.

For inclusion in the coat of this invention, decorative materials made of varying kinds of substances such as, for example, wood, paper, fiber, etc. can be used. For example, overlaying wooden sheets, sheets of Japanese paper, sheets made of cotton yarn and similar materials are usable. Since most of these decorative materials are generally inflammable, their thickness should be limited to within 200$\mu$. When the thickness of a decorative material is so limited, the possible combustibility of the material in case of a fire is too small to have any appreciable adverse effect on the flame-retardance of the coat as a whole.

Now, a description will be given of the flame-retardant clear paint. Selection of the resin ingredient is considered first. The resin base to be selected for the paint must not be easily burned. In consideration of the required incorporation of a flame-retarding agent, the resin base must not be of a baking type or thermosetting type. Further, the resin is required to be of a type capable of giving a dry film having as high rigidity as permissible, because the flame-retarding agent to be incorporated therein has a plasticizing property. The resin must fulfill all these requirements. From this point of view, polyurethane resin of paint grade has been selected. Particularly, it has been found desirable to use a one-component humidity-hardening type polyurethane resin of paint grade or a two-component polyol-hardening type polyurethane resin of paint grade which has a viscosity of 10 – 13 sec. (FC No. 4 at 20°C) and which gives a dry film possessed of a Sword-Locker hardness exceeding 60 or a pencil-scratch hardness of 2H or over. As the flame-retarding agent, tris(2-chloroethyl)-phosphate and tris(2-bromoethyl)-phosphite have been selected. As will be described in detail afterward, phosphorus, bromine and chlorine have outstanding flame-retarding effects. Combined use of phosphorus and bromine proves to be especially effective because it causes phenomena of dehydration, carbonization and oxygen dilution. This means that substances other than those two compounds mentioned above may be used so far as they produce equivalent effects.

This flame-retardant clear paint is generally applied in an amount to give a dry film thickness not larger than 200μ.

For the attachment of the decorative material, there is used an adhesive agent which is also flame-proof. Examples of the adhesive agent usable herein include polyacetic acid vinyl resin containing not more than 10% sulfuric acid guanidine.

The reason for the coat formed by the method of the present invention being flame-retardant is hereinafter explained in detail.

When the coat 2 of the flame-retardant foaming paint is heated, ammonium phosphate monobasic is decomposed to cause phosphorus pentoxide to generate, and pentaerythritol is dehydrated by phosphorus pentoxide and subsequently carbonized to form a carbonized layer. This carbonized layer functions to intercept the heat of flame en route to the substrate. In the meantime, dicyandiamide also undergoes thermal decomposition and liberates nitrogen ($N_2$) gas, which in turn foams the carbonized layer and at the same time dilutes the oxygen in the ambient air, retarding the combustion of the coat.

When the coat 4 of the flame-retardant clear paint is heated, tris(2-chloroethyl)-phosphate causes dehydration of a part of the resin component, with the result that the resin component is carbonized to liberate chlorine ($Cl_2$) gas. The chlorine gas serves to dilute the oxygen content of the ambient air and at the same time shut off direct contact of the coat surface with the air, retarding the combustion. By the same token, tris(2-bromoethyl)-phosphite induces dehydration and consequent carbonization of the resin to liberate bromine ($Br_2$) gas, with the result that the bromine gas dilutes the oxygen content of the ambient air and shuts off direct contact of the coat surface with the air to retard the combustion.

When the humidity-hardening type polyurethane resin is used in the formation of this flame-retardant paint, the coat of this paint enjoys the advantage that it does not entail the phenomenon of brushing.

In addition, this flame-retardant clear paint is clear and the finished coat of this paint retains the clarity intact. This coat, therefore, does not impair the appearance of the underlying substrate material even to the least extent. Rather it helps to enhance its aesthetic value.

The coat according to this invention functions to enhance and preserve the beauty of the decorative material and helps to heighten the practical value of the decorative material.

Where a given substrate subjected to coating is made of cement, asbestos, gypsum, perlite and other similar nonflammable substances, the cost applied thereto need only be proof against the action of flame. Thus, the thicknesses of the component coats may be decreased. Where a substrate given to be coated is made of a metallic substance, the substrate is susceptible to rusting because the flame-retardant foaming paint is a water paint. This is the reason why a metallic substance is not a suitable substrate for coating.

To substrates of plastic substances, the coat of the flame-retardant foaming paint fails to give fast adhesion.

The method of this invention will be described more specifically herein below with reference to the results of the flameretardance test conducted on the surface of coats formed by the method of this invention.

EXAMPLE 1:

A lauan plywood board having a thickness of 4 mm was used as a substrate. A flame-retardant foaming paint composed of 40 g of ammonium phosphate monobasic, 20 g of pentaerythritol, 20 g of dicyandiamide, 40 g of a vehicle using polyvinyl acetate as a main ingredient and having a volatile matter content of 60% and 50 g of water was applied to the said substrate with a sprayer in an amount to give a dry film thickness of 300 μ on the substrate. When this film had dried, an overlaying wooden sheet having a printed pattern and a thickness of 200 μ was attached thereto with a flame-retardant foaming adhesive agent (sold under the name of Bond Flame-Retardant Coat). After the decorative material had dried, a flame-retardant clear paint composed of 100 g of a humidity-hardening type one-component polyurethane resin of paint grade having a viscosity of 13 sec. (FC No. 4 at 20°C) 9 g of tris(2-chloroethyl)-phosphate and 3 g of tris (2-bromoethyl)-phosphite was applied to the decorative material with a sprayer in an amount to give a dry film thickness of 100 μ and then dried to produce a flame-retardant fireproof coat surface. The coat thus formed was subjected to a surface test in accordance with the procedure described in JIS A-1321 titled "Method for Flame-retardance Test on Interior Materials for Buildings and Building Interior Works" and was found as acceptable for Flame-retardance Grade 3. The "Method for Flame-retardance Test on Interior Materials for Buildings and Building Interior Works" of JIS A-1321 may be summarized as follows:

According to JIS A-1321 ["Testing Method for Incombustibility of Internal Finish Material and Procedure of Buildings"] the test for combustibility which is classified into Grade 1, Grade 2 and Grade 3 is carried out by the method outlined below:

A. Test of surface:

Within a heating furnace provided with a smoke-collecting box incorporating a white light source, a test piece measuring (22 cm) × (22 cm) × (6 mm minimum) is placed and heated. The incombustibility is determined by the degree of change occurring on the test piece and the amount of smoke emitted therefrom. The requirements for incombustibility are as follows:

a. Neither fusion nor crack occurs.

b. No residual flame occurs over the minimum duration of 30 seconds following the completion of heating.

c. The smoke coefficient ($C_A$) does not exceed the maximum level designated below for the grade in question.

$$C_A = 240 \log_{10} I_o/I$$

where, $I_o$ denotes the intensity of light (in lux) existing within the smoke-collecting box before the start of furnace heating and I denotes the maximum magnitude of the intensity of light (in lux) observed within the smoke-collecting box during the furnace heating.

Designated maximum level of smoke coefficient ($C_A$):

Incombustibility Grade 1 - 30
Incombustibility Grade 2 - 60
Incombustibility Grade 3 - 120

B. Test of substrate:

This test is applicable only to the substrate which has passed the test for Incombustibility Grade 1. A test piece measuring (50 ± 3mm) × (40 ± 2 mm) × (40 ± 2 mm) is placed in a test furnace at 750° ± 10°C. The test piece is judged acceptable when the temperature increase within the furnace does not exceed the maximum of 50°C.

EXAMPLE 2:

To slabs made of cement, asbestos, gypsum and perlite, decorative sheets of Japanese paper having a thickness of 200 μ were attached by using the same flame-retardant foaming adhesive agent as described in Example 1. After the applied sheets had dried, a flame-retardant clear paint of the same composition as described in Example 1 was applied to their surfaces to produce a coated surface. When the coats thus formed were subjected to the same test under the same conditions as described in Example 1, they were all found as acceptable for Flame-retardance Grade A.

As is apparent from the foregoing description, this invention permits a sufficiently practicable flame-retardant coat to be accomplished by virtue of the synergistic effects between the flame-retardant foaming coat and the flame-retardant clear coat and, at the same time, enables the surface of the decorative material interposed between the two coats mentioned above to be clearly seen through the flame-retardant clear coat formed thereon. Thus, the coat provided by the method of this invention is highly advantageous in that decorative materials of overlaying wooden sheets, sheets of Japanese paper, and sheets of fiber, etc. can have their inherent visual beauty manifested in unimpaired state.

We claim:

1. A method for forming a flame-retardant fireproof and decorative coat, characterized by applying to the surface of a substrate a flame-retardant foaming paint composed of 30 – 40 parts by weight of ammonium phosphate monobasic, 20 parts by weight of pentaerythritol, 20 parts by weight of dicyandiamide and 40 – 60 parts by weight of a vehicle using polyvinyl acetate as a main ingredient and having an involatile matter content of 60% and diluted with water, subsequently attaching thereto a decorative material, and further applying thereto a flame-retardant clear paint composed of 100 parts by weight of a polyurethane resin of the type used in paints having a viscosity of 10 – 13 sec. (FC No. 4 at 20°C), 7 – 10 parts by weight of tris(2-chloroethyl)-phosphate and 1 – 3 parts by weight of tris(2-bromoethyl)-phosphite and finally drying the applied films.

2. A method according to claim 1, wherein the decorative material is one member selected from the group consisting of sheet materials of wood, paper and fiber having a thickness of not more than 200 μ.

3. A method according to claim 1, wherein the polyurethane resin is one member selected from the group consisting of one component humidity-hardening type polyurethane resins and two-component polyol-hardening type polyurethane resins.

4. A method according to claim 1, wherein the substrate to be coated is made of an inflammable material and the coat of flame-retardant foaming paint has a dry film thickness of 300 μ or over.

5. A method according to claim 1, wherein the coat of the flame-retardant clear paint has a dry film thickness not larger than 200 μ.

* * * * *